United States Patent

Konno et al.

Patent Number: 5,357,289
Date of Patent: Oct. 18, 1994

[54] PROJECTOR LENS SYSTEM HAVING THREE LENS GROUPS FOR IMAGE PROJECTOR

[75] Inventors: Toshio Konno, Hoya; Shintaro Nakagaki, Miura; Ighiro Negishi; Tetsuji Suzuki, both of Yokosuka; Fujiko Tatsumi, Yokohama; Ryusaku Takahashi; Keiichi Maeno, both of Yokosuka, all of Japan

[73] Assignee: Victor Company of Japan, Ltd., Yokohama, Japan

[21] Appl. No.: 180,705

[22] Filed: Jan. 13, 1994

Related U.S. Application Data

[63] Continuation of Ser. No. 913,445, Jul. 14, 1992.

[30] Foreign Application Priority Data

Jul. 17, 1991 [JP] Japan .................. 3-201074

[51] Int. Cl.$^5$ .............................. H04N 9/31
[52] U.S. Cl. .................. 348/757; 348/751; 348/752; 353/33
[58] Field of Search ............ 348/751, 752, 757, 756, 348/750, 780, 779, 781, 744; 353/31, 33, 34, 37; 359/362, 634, 629, 754, 784–788, 40, 36, 649, 651; H04N 9/31, 9/30

[56] References Cited

U.S. PATENT DOCUMENTS

| | | | |
|---|---|---|---|
| 4,191,456 | 3/1980 | Hong et al. | 358/61 |
| 4,206,973 | 6/1980 | Ikemori | 350/214 |
| 4,453,178 | 6/1984 | Miyatako et al. | 358/60 |
| 4,522,471 | 6/1985 | Nishioka | 350/449 |
| 4,850,685 | 7/1989 | Kamakura et al. | 358/61 |
| 5,130,826 | 7/1992 | Takanashi et al. | 358/61 |
| 5,153,752 | 10/1992 | Kurematsu et al. | 358/61 |

FOREIGN PATENT DOCUMENTS

| | | | |
|---|---|---|---|
| 63-311892 | 12/1988 | Japan | H04N 9/31 |
| 3152526 | 6/1991 | Japan | G03B 33/12 |
| 3243912 | 10/1991 | Japan | G02B 27/28 |

*Primary Examiner*—James J. Groody
*Assistant Examiner*—Safet Metjahic
*Attorney, Agent, or Firm*—Michael N. Meller

[57] ABSTRACT

This specification discloses an image projector for projecting a tri-color composite optical image on a screen as a magnified optical image. A reading light beam emitted from a light source is separated into three color beams, e.g., Red, Green and Blue color beams through a tri-color separation and composition optical system. The separated color beams are irradiated on image forming devices provided correspondingly with Red, Green and Blue color images to read out color images respectively therefrom. Each of the reflected light beams from the image forming device carrying color image information impinges again on the tri-color separation and composition optical system to compose a composite image beam. The composite image beam is projected on the screen through an optical lens system comprising a first lens group, a second lens group and a third lens group disposed along an optical axis in order. The first lens group forms a composite color image on the second lens group by focusing the composite image beam from the tri-color separation and composition optical system. The second lens group converges the composite image beam therefrom to the third lens group. The third lens group projects the composite image beam on the screen as a magnified image. A focal length of the lens system is arranged shorter than a back-focal length defined as a distance between the front surface of the first lens group and a object focal point thereof.

2 Claims, 3 Drawing Sheets

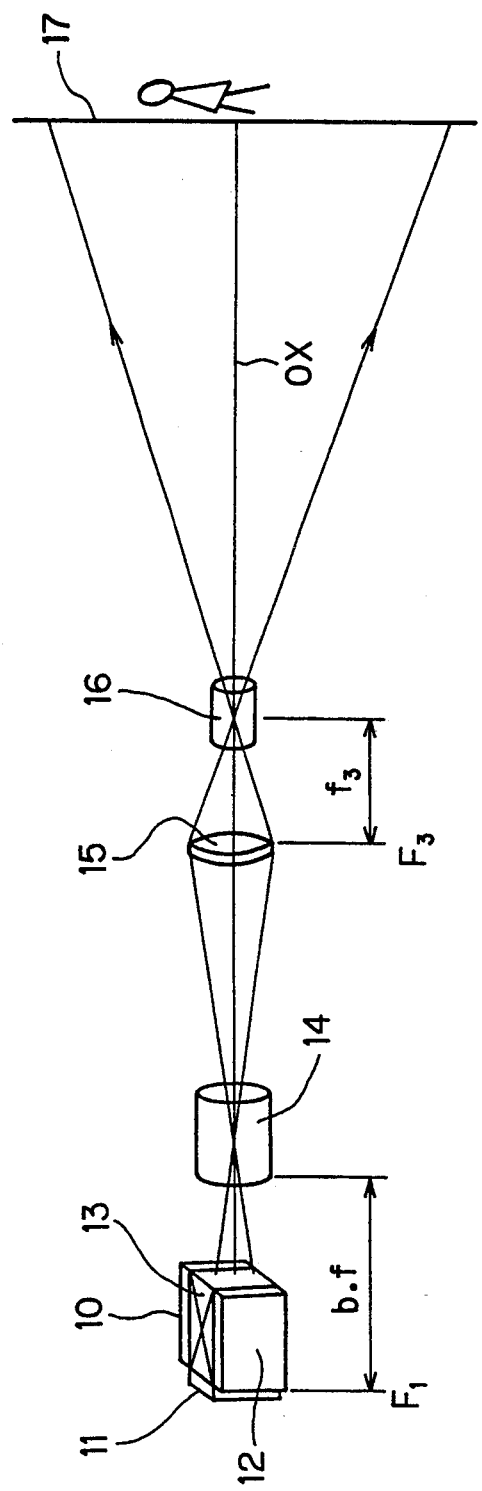

PROJECTOR LENS SYSTEM HAVING THREE LENS GROUPS FOR IMAGE PROJECTOR

This application is a continuation of application Ser. No. 913,445, filed Jul. 14, 1992.

BACKGROUND OF THE INVENTION

1. Field of the Invention

The present invention relates to improvements of an image projector and more particularly to an image projector capable of displaying a high definition image in spite of a short projection length.

2. Description of the Related Art

Recently, an image projector has been proposed in which three liquid crystal panels are employed correspondingly with Red (R), Green (G) and Blue (B) signals to obtain a high definition image. Therefore, the image projector has such a construction as capable of projecting a composite image consist of the three color images from three liquid crystal panels on a screen through a polarization beam splitter and a tri-color separation and composition optical system having dichroic filters.

It is well known that, in order to obtain a highly magnified image on the screen at a short projection length defined between the projection lens and the screen, it requires a projection lens having a short focal length. In addition, the projection lens has to be positioned in such a manner that the object focal point of the projection lens resides in the proximity of an object to be projected on the screen. These facts are derived from formulas of lens.

FIG. 1 is a explanatory view for explaining formulas of lens in the prior art, wherein the numeral 30 indicates a focusing lens, 31 an object, and 32 an image. The symbol 'f' indicates focal length of the lens 30, '$F_1$' object focal point, '$F_b$' image focal point, 'a' a distance of the object 31 from the center of the lens 30, 'b' a distance of the image 32 from the center of the lens 30, 'b.f.' a back-focal length defined as a distance between the front surface of the lens 30 and object focal point $F_a$ or a distance between the rear surface of the lens 30 and the image focal point $F_b$, '$h_a$' a height of the object 31, '$h_b$' a height of the image 32.

The formulas of lens are expressed as follows:

$$1/a + 1/b = 1/f \quad (1)$$

$$h_b/h_a = b/a = m \quad (2)$$

$$b = f(1+m) \quad (3)$$

$$m = 1/((a/f)-1) \therefore (a > f) \quad (4)$$

The expressions (3) and (4) are derived from the expression (1) and (2), wherein 'm' indicates the magnification of the lens 30.

As clearly understood from the expression (3) and (4), it is effective to use a short focal length 'f' for the short projection length 'b' and is effective to position the object 31 in the proximity of the object focal point '$F_a$' for obtaining a large magnification 'm'.

On the contrary, the aforementioned image projector requires a projection lens having a long focal length 'f' because there are installed the polarization beam splitter 24 and a tri-color separation and composition optical system 25 between a group of liquid crystal panels 21, 22, and 23 and the projection lens 16, as described hereafter referring to FIG. 3 and FIG. 4, which poses a great difficulty to obtain a large magnified projection image on the screen at a shorter projection distance.

One of the attempts to solve the problem is to provide an optical lens system having a longer back-focal length than a focal length, for instance, called the "Retro-Focus" method.

FIG. 2 is an explanatory view for explaining the Retro-Focus method in the prior art.

Referring to FIG. 2, an optical lens system according to the Retro-Focus method consists of a concave lens group 1 and convex lens group 2 having an overall focal length 'f'. After a light 3 coming in parallel with an optical axis 4 is incident to the concave lens group 1 and refracted outward away from the optical axis 4, the light 3 is incident to the convex lens group 2 and refracted inward toward the optical axis 4, so that it can be obtained a back focal length 'b.f.' which is longer than the focal length f.

But, in this case of employing the above optical lens system, there exists such a problem that it is difficult to make use of the optical lens system because of inevitable aberration of various kinds. This results in the failure of obtaining a better high definition image, while a large magnified projection image may be obtained at a short projection distance.

SUMMARY OF THE INVENTION

Accordingly, a general object of the present invention is to provide a novel and useful image projector in which the above disadvantage has been eliminated.

A more specific object of the present invention is to provide an image projector for projecting a magnified tri-color composite optical image on a screen. The image projector generally comprises a light source emitting a reading light, image forming means provided correspondingly with Red, Green and Blue color images, a tri-color separation and composition optical system for obtaining the the tri-color composite beam from the image forming device, and a lens system comprising of a first lens group, a second lens group and a third lens group disposed along a optic axis in order. A focal length of the overall lens system is made shorter than a back-focal length defined as a distance between the front surface of the first lens group and an object focal point of the overall lens system.

Upon operation of the image projector of the present invention, the reading light beam emitted from a light source is separated into three color beams, e.g., Red, Green and Blue color beams through a tri-color separation and composition optical system. The separated color beams irradiate on image forming devices provided correspondingly with Red, Green and Blue color images to read out color images therefrom, respectively. Each of reflected light beams from the image forming devices carrying image information, again impinges on the tri-color composition optical system to obtain a composite image beam. The first lens group forms a composite light image on the second lens group by focusing the composite image beam from the tri-color separation and composition optical system. The second lens group converges the composite image beam therefrom to the third lens group. The third lens group projects the the composite image beam on the screen as a magnified image picture.

Other objects and further features of the present invention will be apparent from the following detailed description when read in conjunction with the accompanying drawing.

BRIEF DESCRIPTION OF THE DRAWINGS

Preferred embodiments of the present invention will be described with reference to the accompanying drawings wherein:

FIG. 3 is an explanatory view showing a basic structure of an image projector according to the present invention.

DETAILED DESCRIPTION OF THE PREFERRED EMBODIMENT

Figure 1:
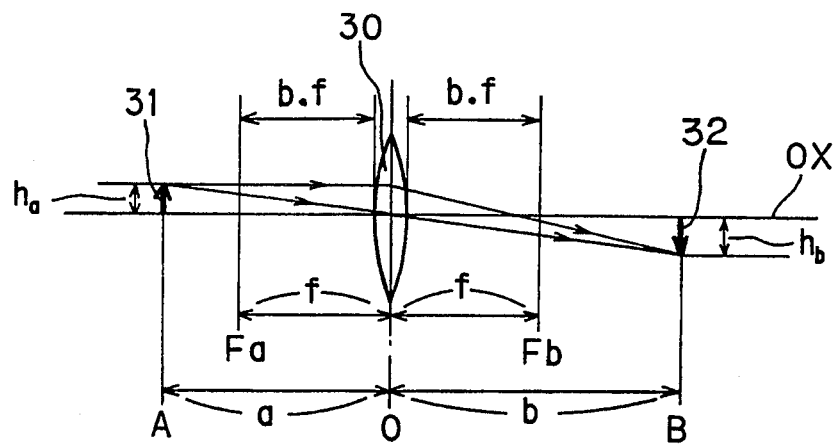
FIG. 1 is an explanatory view for explaining formulas of lens in the prior art.
Figure 2:
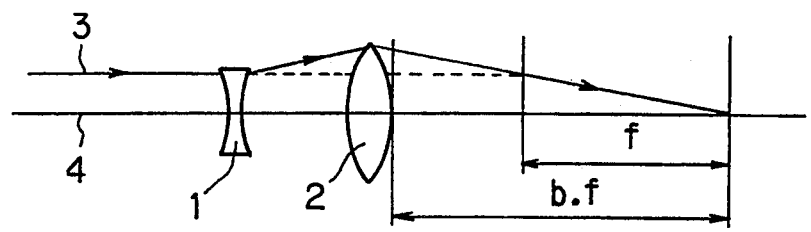
FIG. 2 is an explanatory view for explaining the Retro-Focus method in the prior art.

FIG. 3 is an explanatory view showing a basic structure of an image projector according to the present invention, in which the numeral 10 indicates a Red image forming device, 11 a Green image forming device, 12 a Blue image forming device, 13 a tri-color separation and composition optical system, 14 a first lens group having a back-focal length 'b.f.' defined as a distance between a front surface of the first lens group and an object focal point 'F₁', 15 a second lens group for converging an incident light, 16 a third lens group having an object focal point 'F₃' and a focal length 'f₃' for projecting a magnified image on a screen 17. Each of the lens groups 14, 15, and 16, the tri-color separation and composition system 13 and the Green image forming device 11 are provided along an optical axis OX. The Green image forming device 11 is positioned in the left side of the object focal point F1 of the first lens group 14 along the optical axis OX. The second lens group 15 is positioned nearby the object focal point F₃ of the third lens group 16. Each of the image forming devices forms a color image in accordance with an intended color, respectively.

Next, a description will be given to the operation of the basic structure of the image projector referring to FIG. 3.

After a reading light from a light source (not shown) is separated into three color lights, R, G and B, through a reflecting mirror, dichroic mirror and so on (described hereafter), each of the three color lights respectively irradiates one of the image forming devices in accordance with the color. Each of the lights reflected from the image forming devices is incident to the tri-color separation and composition system 13 to compose a composite optical image beam, and the composite image beam is focused as a optical image on the second lens group 15 through the first lens group 14. The optical image on the second lens group 15 is projected on the screen 17 as a predetermined magnified picture through the third lens group 16.

In the above construction, if the composite optical image beam is focused on the second lens group 15 through the first lens group 14 as an optical image with magnification ×1, the focal length 'f' of the overall lens system comprising of the lens groups 14, 15, and 16 becomes the same as the focal length 'f₃' of the third lens group 16.

Further, if the composite optical image beam is focused on the second lens group 15 through the first lens group 14 as an optical image with a magnification of ×2, the focal length 'f' of the overall lens system becomes half of the focal length 'f₃' of the third lens system 16.

These facts can be expressed by means of the following expression:

$$f = f_3 / ml \qquad (5)$$

wherein ml; the imagery magnification by the first lens group 14.

f₃; the focal length of the third lens group 16.

f; the focal length of the overall lens system.

The above expression (1) can be easily derived on the basis of a geometrical construction and the basic formulas of lens, however, the detailed discussion is omitted for simplicity here.

As clearly understood from the expression (5), the value of the focal length 'f' can be reduced to any value by choosing the value of the focal length 'f₃' of the third lens group 16 or by choosing the value of the imagery magnification 'ml' of the first lens group 14. Therefore, according to the present invention, the focal length 'f' of the overall lens system can be easily made shorter than the back-focal length 'b.f' which is defined as a distance between the object focal point 'F₁' and the front surface of the first lens group 14.

In this case, it is possible to make the value of the focal length 'f' of the overall lens system, for instance, below 30 mm. Thus, this enables a short focal length of the lens system and realizing a magnified projection image on the screen 17 at a short projection distance between the third lens group 16 and the screen 17.

Figure 4:
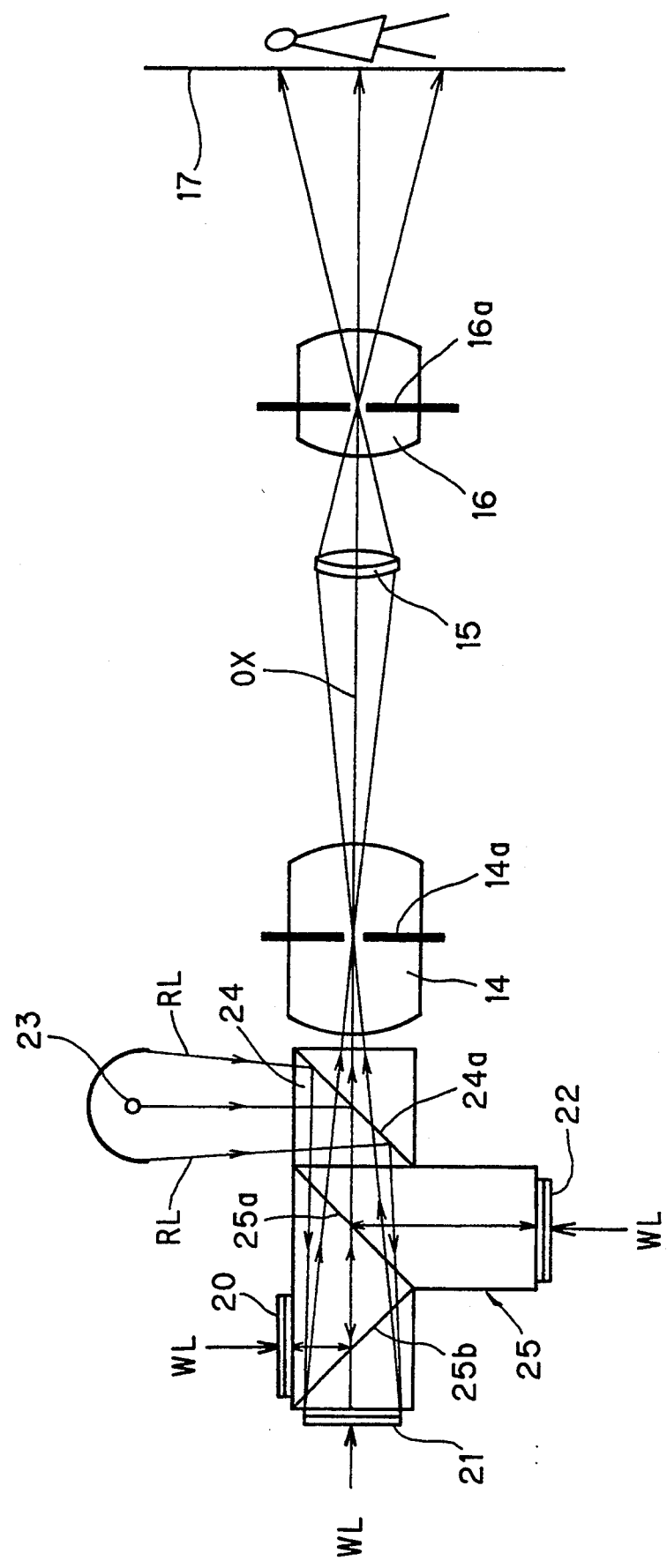
FIG. 4 is an explanatory view of an embodiment of the present invention.

FIG. 4 is an explanatory view of an embodiment of the present invention, in which spatial light modulators are used as the aforementioned image forming devices.

Figure 5:
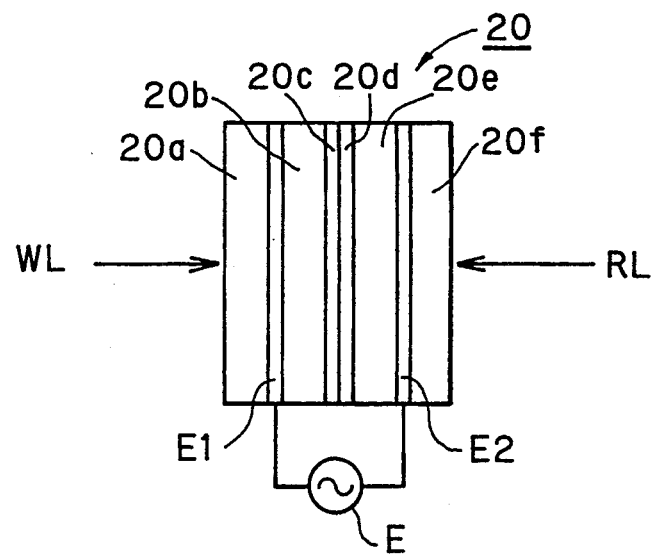
FIG. 5 is an explanatory view of a structure of a spatial light modulator.

FIG. 5 is an explanatory view of a structure of a spatial light modulator.

In these figures, identical symbols are assigned to the constituents similar or corresponding to those shown in FIG. 3.

Numerals 20, 21, and 22 designate spatial light modulators (image forming means) correspondingly with Red, Green, and Blue, and to which a description will be given at first, referring to FIG. 5.

For instance, the spatial light modulator 20 (21, 22) is formed as such that a glass substrate 20a, a transparent electrode E1, a photoconductive layer 20b, a light blocking layer 20c, a dielectric mirror 20d, a photomodulation layer 20e, an another transparent electrode E1, and another glass substrate 20f are laminated in order.

Upon writing a light image on the spatial light modulator 20, a power source E is connected between the transparent electrodes E1, E2, and a writing light WL carrying desired information impinges on the photoconductive layer 20b through the transparent electrode E1, so that electric resistance of the photoconductive layer 20b is changed correspondingly with the intensity distribution of the beam of writing light WL, thus, an electric charge image is formed at an interface between the photoconductive layer 20b and the light blocking layer 20c correspondingly with the intensity distribution of the writing light WL.

Upon reading the image of electric charge, the reading light RL impinges on the photomodulation layer 20e through the transparent electrode E2. The reading light having passed the photomodulation layer 20e is reflected by the dielectric mirror 20d, and is projected outward through the photomodulation layer 20e and the transparent electrode E2. The reflected reading light RL is modulated by the photomodulation layer 20e correspondingly with the intensity distribution of the charge image formed on the interface between the photoconductive layer 20b and the light blocking layer 20c, and is projected as a beam light corresponding to the field intensity distribution.

Next, a description is given to an embodiment of the present invention, referring to FIG. 4.

In FIG. 4, numeral 20, 21 and 22 indicate spatial light modulators for color image forming means, e.g., Red color, Green color and Blue color, respectively, 23 a light source for a reading light RL, 24 a polarization beam splitter with a semi-transparent mirror film 24a set at 45 degree angle toward an optical axis OX therein, 25 a tri-color separation and composition optical system comprising a dichroic filter 25a and 25b, 14a an iris of the first lens group for controlling the light quantity, 16a an iris of the third lens group 16.

Next, description is given to the operation of the embodiment of the present invention referring to FIG. 4.

In FIG. 4, the reading light beam RL emitted from a light source 23 is irradiated on the semi-transparent mirror film 24a of the polarization beam splitter 24, and is reflected by the semi-transparent mirror film 24a at right angles toward left. The reflected light beam is an S-polarized light beam, and impinges on the tri-color separation and composition optical system 25. Thereafter the Green light beam component (referred to as "beam G") impinges on the spatial light modulator 21 passing through dichroic filters 25a and 25b. The Red light beam component (beam R) of the reading light having passed through the dichroic filter 25a is reflected by the dichroic filter 25b at right angles upwardly, and impinges on the spatial light modulator 20. Further, the Blue light beam component (beam B) of the reading light is reflected by the dichroic filter 25a at right angles downwardly, and impinges on the spatial light modulator 22. Each of beams R, G and B is modulated by and reflected back from the respective spatial light modulators 20, 21, and 22. Thus, the reflected beams R, G and B contain (intensity modulated) the information corresponding to the respective color images, and impinge again on the tri-color separation and composition optical system 25 through each of the dichroic filters 25a and 25b to compose a single beam of tri-color composite light (referred to as "composite beam"). The composite beam impinges on the beam splitter 24, where a P polarized light of the composite beam only passes through the beam splitter 24. The composite beam having passed through impinges on the first lens group 14 and forms an optical image in the second lens group 15 by being controlled a quantity of light with the iris 14a. Further, the optical image formed thereon is projected on the screen 17 as a magnified optical image through the third lens group 16 by being controlled a quantity of light with the iris 16a.

According to the present invention, although the back focal length 'b.f' becomes longer because the tri-color separation and composition optical system 25 and the polarization beam splitter 24 is installed between the group of spatial light modulators (20, 21 and 22) and the first lens group 14, the focal length of the overall lens system can be reduced in the foregoing lens construction, so that a magnified projection image is obtain in spite of a short projection length between the third lens group 16 and the screen 17.

Further, the present invention enables to obtain a high definition image without decreasing brightness because the beam forming the image is converged on the entrance pupil of the iris 16a of the third lens group 16 by the second lens group 15.

Further more, according to the present invention, various kinds of aberration can be easily reduced upon realizing a high luminance and high definition image because performance of each of the lens groups can be pursued individually.

It should be noted that a single component projection lens can be used in the case of applying the present invention to a Rear-projection display system, so that there exists no relation between the aberration distortion and the shortening of focal length, which realizes a suitable Rear-projection display system.

It should be also noted that, as described in the foregoing, the light modulators 20, 21 and 22 are employed as image forming devices in the embodiment of the present invention, but it is possible to employ such devices as liquid crystal panels which can modulate the light.

Although the invention is described in the specific terms, it is to be noted that the described embodiment is not exclusive and various changes and modifications may be imparted without departing from the scope of the invention which is limited solely by the appended claims.

What is claimed is:

1. An image projector for projecting a tri-color composite light image on a screen comprising:
   a light source emitting a reading light;
   image forming means provided correspondingly with Red, Green and Blue color images;
   a tri-color separation and composition optical system for obtaining a tri-color composite beam from said image forming means, and
   a lens system comprising a first lens group for focusing a light image, a second lens group for converging an incident light and a third lens group having a focal length "$f_3$" for projecting a magnified image on said screen, said first, second and third lens groups are disposed along an optical axis in the order named, wherein said first lens group being positioned so as to form a composite light image having an imagery magnification "$ml$" nearby said second lens group by focusing said tri-color composite beam coming from said tri-color separation and composition optical system, said second lens group being positioned nearby an object focal point of said third lens group to converge said tri-color composite beam from said first lens group into said third lens group, said third lens group being positioned so as to project said tri-color composite image beam on said screen as a magnified image at a short projection distance, with the overall focal length "f" of said lens system being equal to $f_3/ml$ and with the value of the focal length "$f_3$" of said third lens group and the value of said imagery magnification "$ml$" selected such that the focal length "f" of the lens system has a value shorter than the back-focal length defined as a distance between a front surface of said first lens group and an object focal point thereof.

2. An image projector as claimed in claim 1, wherein said second lens group is positioned nearby an object focal point of said third lens group.

* * * * *